(12) United States Patent
Tokunaga et al.

(10) Patent No.: US 8,437,542 B2
(45) Date of Patent: May 7, 2013

(54) IMAGE PROCESSING APPARATUS, METHOD, AND PROGRAM

(75) Inventors: Nodoka Tokunaga, Tokyo (JP); Jun Murayama, Tokyo (JP)

(73) Assignee: Sony Corporation, Tokyo (JP)

( * ) Notice: Subject to any disclaimer, the term of this patent is extended or adjusted under 35 U.S.C. 154(b) by 263 days.

(21) Appl. No.: 12/839,851

(22) Filed: Jul. 20, 2010

(65) Prior Publication Data
US 2011/0058736 A1 Mar. 10, 2011

(30) Foreign Application Priority Data

Sep. 4, 2009 (JP) ................................. 2009-204426

(51) Int. Cl.
*G06K 9/00* (2006.01)
(52) U.S. Cl.
USPC ........................................................ 382/165
(58) Field of Classification Search .......... 382/164–165, 382/171, 192–195, 199
See application file for complete search history.

(56) References Cited

U.S. PATENT DOCUMENTS

| | | | | | |
|---|---|---|---|---|---|
| 6,137,498 | A * | 10/2000 | Silvers | .......................... | 345/629 |
| 6,549,679 | B1 * | 4/2003 | Zheng | ........................... | 382/284 |
| 6,556,210 | B1 * | 4/2003 | Yamamoto et al. | ........... | 345/582 |
| 7,012,623 | B1 * | 3/2006 | Kusama et al. | ............... | 345/634 |
| 2005/0100319 | A1 * | 5/2005 | Saed | ............................... | 386/69 |
| 2005/0147322 | A1 * | 7/2005 | Saed | ............................. | 382/284 |
| 2007/0296824 | A1 * | 12/2007 | Paine et al. | ............... | 348/222.1 |

FOREIGN PATENT DOCUMENTS

| | | |
|---|---|---|
| JP | 11-341264 | 12/1999 |
| JP | 11-341266 | 12/1999 |
| JP | 2000-200283 | 7/2000 |
| JP | 2000-295453 | 10/2000 |
| JP | 2000-298722 | 10/2000 |
| JP | 2005-100120 | 4/2005 |

* cited by examiner

*Primary Examiner* — Bernard Krasnic
*Assistant Examiner* — Weiwen Yang
(74) *Attorney, Agent, or Firm* — Oblon, Spivak, McClelland, Maier & Neustadt, L.L.P.

(57) ABSTRACT

An image processing apparatus includes a dividing unit configured to divide a target candidate image, which is assigned as a candidate of a target image, into blocks when a photomosaic image is generated by dividing the target image into the blocks and replacing each block with a raw image selected from multiple raw images; a block-class classification unit configured to place each block in the target candidate image into a class selected from multiple classes defined by a characteristic associated with color; a comparing unit configured to compare the number of blocks in the target candidate image in a class and the number of raw images in the same class; and a selecting unit configured to select a target candidate image among a multiple target candidate images to be assigned as the target image on the basis of comparison results of the target candidate images obtained by the comparing unit.

12 Claims, 11 Drawing Sheets

IMAGE PROCESSING APPARATUS, METHOD, AND PROGRAM

BACKGROUND OF THE INVENTION

1. Field of the Invention

The present invention relates to an image processing apparatus, a method, and a program and, more specifically, relates to an image processing apparatus, a method, and a program that enable acquisition of high-quality photo mosaic images.

2. Description of the Related Art

The wide use of digital cameras has allowed users to take a large number of photographs. Thus, there is a need for methods of effectively displaying the large number of acquired photographs.

Photo-mosaic images are used in a method of effectively displaying acquired photographs. A photo-mosaic image is obtained by dividing a target image into multiple blocks and replacing the blocks with other images (hereinafter, referred to as "replacement images") that have colors similar to the blocks.

In this way, when the photo-mosaic image is viewed from a distance fairly far away, the subject of the images appears the same as the subject of the target image. However, when the photo-mosaic image is viewed from distance fairly close, an array of multiple replacement images is viewed.

To generate such a photo-mosaic image, there is a technique according to the related art for selecting images disposed at blocks by determining through weighted calculation the distance from a representative value of the color of each block in a target image to a representative value of the color of each image, which is a candidate of a replacement image (for example, refer to Japanese Unexamined Patent Application Publication No. 2000-298722). There is also a technology according to the related art for separating a target image into separated areas containing a plurality of blocks on the basis of color similarity, placing candidates of replacement images into classes corresponding to the separated areas, and generating a photo-mosaic image by using a candidate placed into each class corresponding to each separated area (for example, refer to Japanese Unexamined Patent Application Publication No. 2005-100120).

Furthermore, the related art provides a method of generating a photo-mosaic image while maintaining the color distribution of the original target image by further dividing each of the blocks in a target image and matching these with images that are candidates of replacement images (for example, refer to Japanese Unexamined Patent Application Publication Nos. 11-341266 and 2000-295453).

Moreover, the related art provides a technique for selecting a raw image to be assigned to a block by comparing the average luminance of each blocks and the replacement image (for example, refer to Japanese Unexamined Patent Application Publication No. 11-341264). The related art also provides a technology for requesting a server that holds candidates of replacement images to select a replacement image for each block via a network (for example, refer to Japanese Unexamined Patent Application Publication No. 2000-200283).

SUMMARY OF THE INVENTION

In the past, many image images and technical know-how were necessary for generating a photo-mosaic image. Thus, photo-mosaic images were commercially used in movie promotion posters, corporate logos, and so on. However, it was difficult for an average user to generate a high-quality photo-mosaic image using a personal computer or the like.

To acquire a high quality photo-mosaic image, i.e., a photo-mosaic image with good visual quality, it is necessary to select replacement images for the blocks in the target image without duplication. This is because when images identical to the replacement image selected for a prescribed block are arranged near the prescribed block, the acquired photo-mosaic image will have low visual quality when viewed from either up close or far away. To acquire a photo-mosaic image with good quality, it is necessary to select replacement images having a color distribution similar to that of the blocks in the target image.

With the techniques described above, however, the candidates of replacement images provided in advance for the blocks in a given target image is not assured to not include duplications. Thus, in particular, when there is a shortage in the number of candidates of replacement images with respect to the number of blocks in a specific color, the same replacement image is often used twice or more, and there is a high possibility that a photo-mosaic image with low quality is generated.

The present invention has been conceived in light of the situations described above, and it is desirable to acquire a photo-mosaic image with better quality.

An image processing apparatus according to an embodiment of the present invention includes dividing means for dividing a target candidate image, which is assigned as a candidate of a target image, into blocks when a photo-mosaic image is generated by dividing the target image into the blocks and replacing each of the blocks with a raw image selected from a plurality of raw images; block classification means for placing each of the blocks in the target candidate image into a class selected from a plurality of classes defined by a characteristic associated with color; comparing means for comparing, for each of the classes, the number of blocks in the target candidate image in a class and the number of raw images in the same class; and selecting means for selecting a target candidate image among a plurality of target candidate images to be assigned as the target image on the basis of comparison results of the target candidate images obtained by the comparing unit.

The selecting means may select a target candidate image on the basis of the comparison results for the classes indicating shortages in the raw images with respect to the blocks.

The selecting means may select, among the target candidate images, a target candidate image having a smallest sum of shortages in the classes as the target image and, when multiple target candidate images has the smallest sum of shortages, may select one of the target candidate images having the smallest sum of shortages as the target image on the basis of the comparison results for the classes indicating excesses in the raw images with respect to the blocks.

The image processing apparatus may further include assignment receiving means for receiving an assignment of a plurality of target candidate images as candidates of the target image.

The image processing unit may further include block-characteristic value calculating means for calculating a characteristic value of the characteristic for each of the blocks on the basis of pixel values of pixels in each of the blocks in a target candidate image; center-value calculating means for calculating, on the basis of the characteristic value of each of the blocks, a center value representing a characteristic value of the characteristic for each of the classes, the center value being calculated for a predetermined number of classes and used for classification; and image classification means for calculating, on the basis of pixel values of pixels in the raw images, a characteristic value of the characteristic of each of the raw images and placing each of the raw images into a class on the basis of a distance between the class and the center value, wherein the image classification means may place each of the blocks into one of the classes on the basis of the characteristic value of the block and the distance between the class and the center values.

The image processing unit may further include block-characteristic value calculating means for calculating a characteristic value of the characteristic for each of the blocks on the basis of pixel values of pixels in each of the blocks in a target candidate image, wherein the block classification means places each of the blocks into one of the classes on the basis of a distance from the characteristic value of each of the blocks to a predetermined center value that is used for classification and represents a characteristic value of the characteristic of each of the classes, and wherein each of the raw images is placed into a class in advance on the basis of the center values.

A method of image processing or program according to another embodiment of the present invention includes the steps of dividing each target candidate image into the blocks by the dividing means; placing each of the blocks in each of the target candidate images into one of the classes by the block classification means; comparing the number of blocks and the number of raw images in each of the classes by the comparing means; and selecting one of the target candidate images on the basis of the comparison results by the selecting means.

In another embodiment of the present invention a target candidate image, which is assigned as a candidate of a target image, is divided into blocks when a photo-mosaic image is generated by dividing the target image into the blocks and replacing each of the blocks with a raw image selected from a plurality of raw images; each of the blocks in the target candidate image is placed into a class selected from a plurality of classes defined by a characteristic associated with color; for each of the classes, the number of blocks in the target candidate image in a class are compared with the number of raw images in the same class; and a target candidate image is selected among a plurality of target candidate images to be assigned as the target image on the basis of comparison results of the target candidate images obtained by the comparing unit.

According to an embodiment of the present invention, a photo-mosaic image with better quality can be acquired.

DESCRIPTION OF THE PREFERRED EMBODIMENTS

Figure 1:
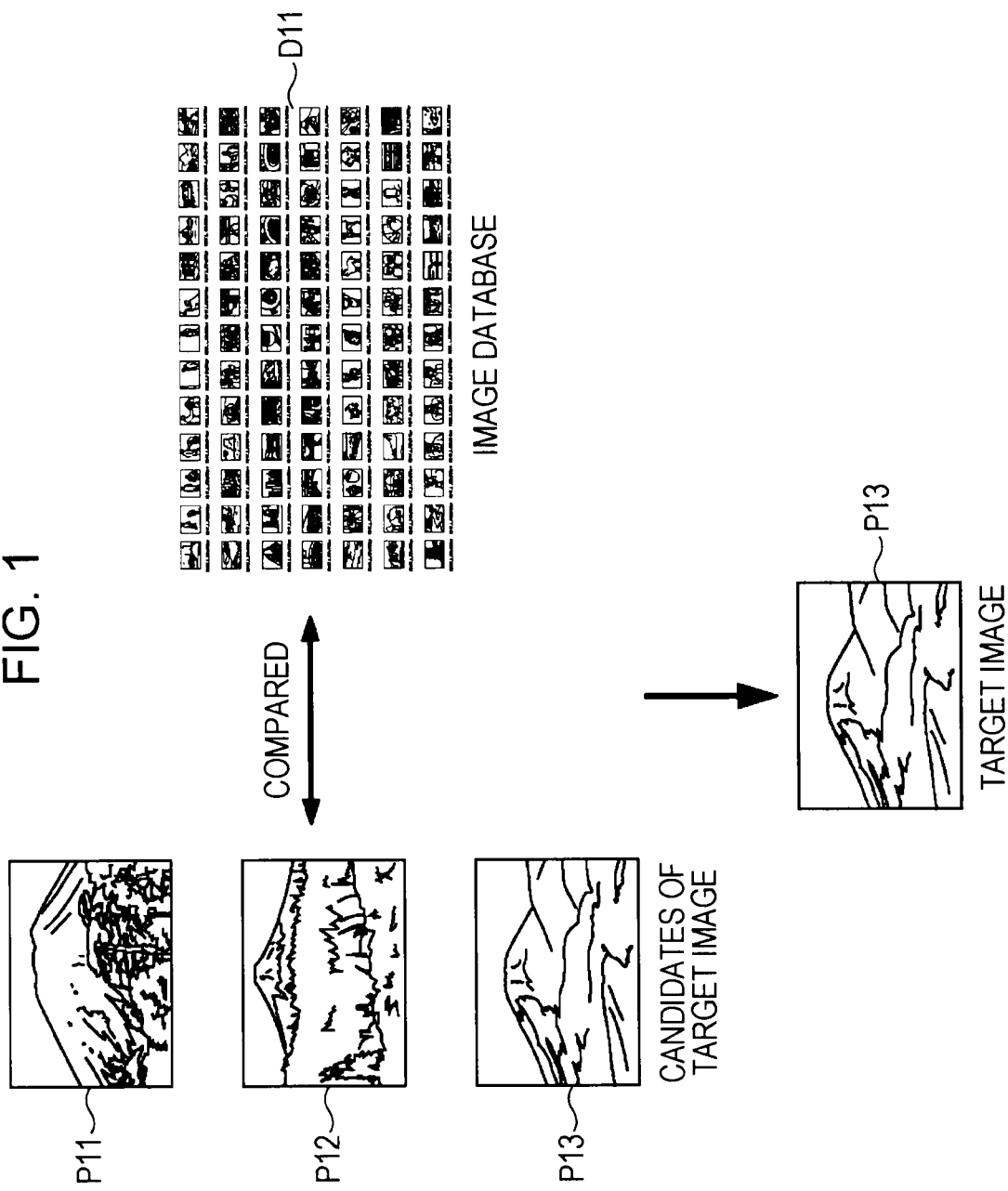
FIG. 1 illustrates, in outline, the processing carried out by an image processing apparatus according to an embodiment of the present invention.

Embodiments of the present invention will be described below with reference to the drawings.
First Embodiment
Overview of Processing by Image Processing Apparatus FIG. 1 illustrates, in outline, processing carried out by an image processing apparatus according to an embodiment of the present invention.

The image processing apparatus generates a photo-mosaic image by dividing a target image into multiple blocks and replacing the blocks with prerecorded raw images.

To generate a photo-mosaic image, the image processing apparatus compares target candidate images P11 to P13, which are candidates of a target image, and raw images constituting an image database D11 prepared in advance.

When a photo-mosaic image is to be generated using optimal target candidate images, i.e., the image database D11, based on the comparison results, a target candidate image that can generate a photo-mosaic image with the best visual quality is selected. In the example illustrated in FIG. 1, the target candidate image P13 is selected as the target image.

Specifically, a target candidate image is divided into multiple blocks, and the blocks are placed into a plurality of classes. Each class is determined on the basis of a characteristic color value associated with color extracted from the target candidate image. Each block falls into a class of which the characteristic color value is the most similar with that of each block. In this way, the number of blocks in each class is determined for each target candidate image.

The raw images constituting the image database D11 are also placed into classes. For each class, the number of blocks in the class and the number of raw images are compared to determine an excess or a shortage in the number of raw images with respect to the number of blocks. Then, on the basis of the excess or shortage in each class, the target candidate image having the least shortage in raw images with respect to the number of blocks is selected as a target image.

A target image is selected in this way because of the following reason. That is, since the blocks and raw images placed into the same class have similar characteristics associated with color, for example, when a representative color is set as an index, blocks in a given class are replaced by raw materials in the same class. Accordingly, for each class, when the shortage in the number of raw images with respect to the number of blocks is small, it is less likely that the same raw image is to be selected twice. Therefore, a photo-mosaic image with better quality is acquired.

Figure 2:
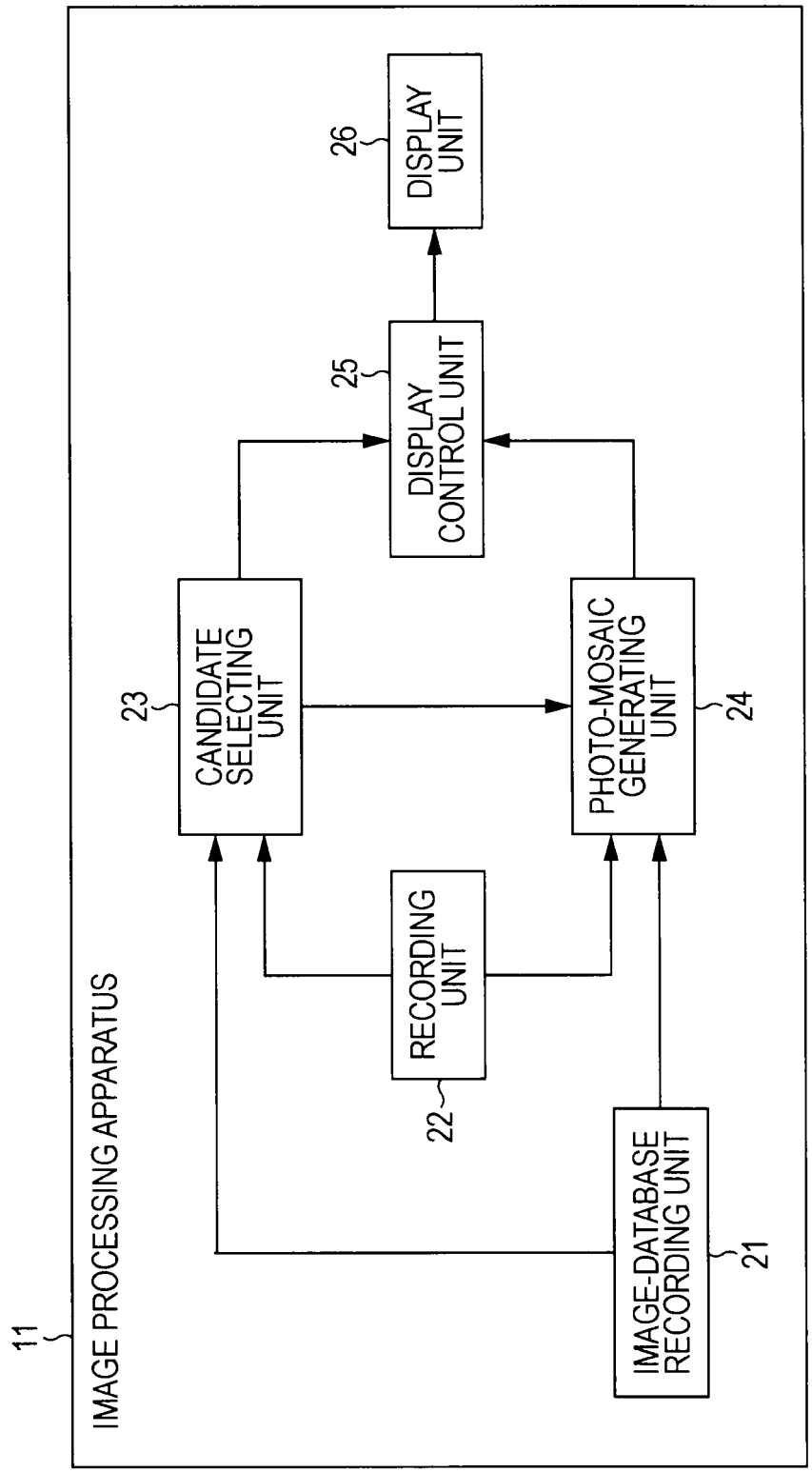
FIG. 2 illustrates an example configuration of the image processing apparatus.

With the image processing apparatus, the target candidate image P13 selected as a target image and raw images in the image database D11 are used to generate a photo-mosaic image.
Configuration of Image Processing Apparatus The image processing apparatus that carries out the above-described processing to generate a photo-mosaic image is, for example, configured as illustrated in FIG. 2.

Specifically, an image processing apparatus 11 includes an image-database recording unit 21, a recording unit 22, a candidate selecting unit 23, a display control unit 25, and a display unit 26.

A plurality of raw images is stored in the image-database recording unit 21, which supplies the raw images to the candidate selecting unit 23 or a photo-mosaic generating unit 24. These raw images constitute an image database. A plurality of target candidate images, which are candidates of a target image, are stored in the recording unit 22, which supplies the target candidate images to the candidate selecting unit 23 or the photo-mosaic generating unit 24.

The candidate selecting unit 23 selects one of target candidate images sent from the recording unit 22 as a target image using the raw images from the image-database recording unit 21 and supplies the selection result to the photo-mosaic generating unit 24 and the display control unit 25.

The photo-mosaic generating unit 24 receives from the recording unit 22 the target image specified by the selection result from the candidate selecting unit 23 and uses the target image and the raw images sent from the image-database recording unit 21 to generate a photo-mosaic image. The generated photo-mosaic image is sent from the photo-mosaic generating unit 24 to the display control unit 25.

The display control unit 25 sends the selection result from the candidate selecting unit 23 or the photo-mosaic image from the photo-mosaic generating unit 24 to the display unit 26 for display. The display unit 26 displays various images in accordance with the control of the display control unit 25.

The finally obtained photo-mosaic image is not only displayed but may also be printed, recorded on a recording medium as data, and/or transferred to another apparatus connected to the image processing apparatus 11.

Configuration of Candidate Selecting Unit

Figure 3:
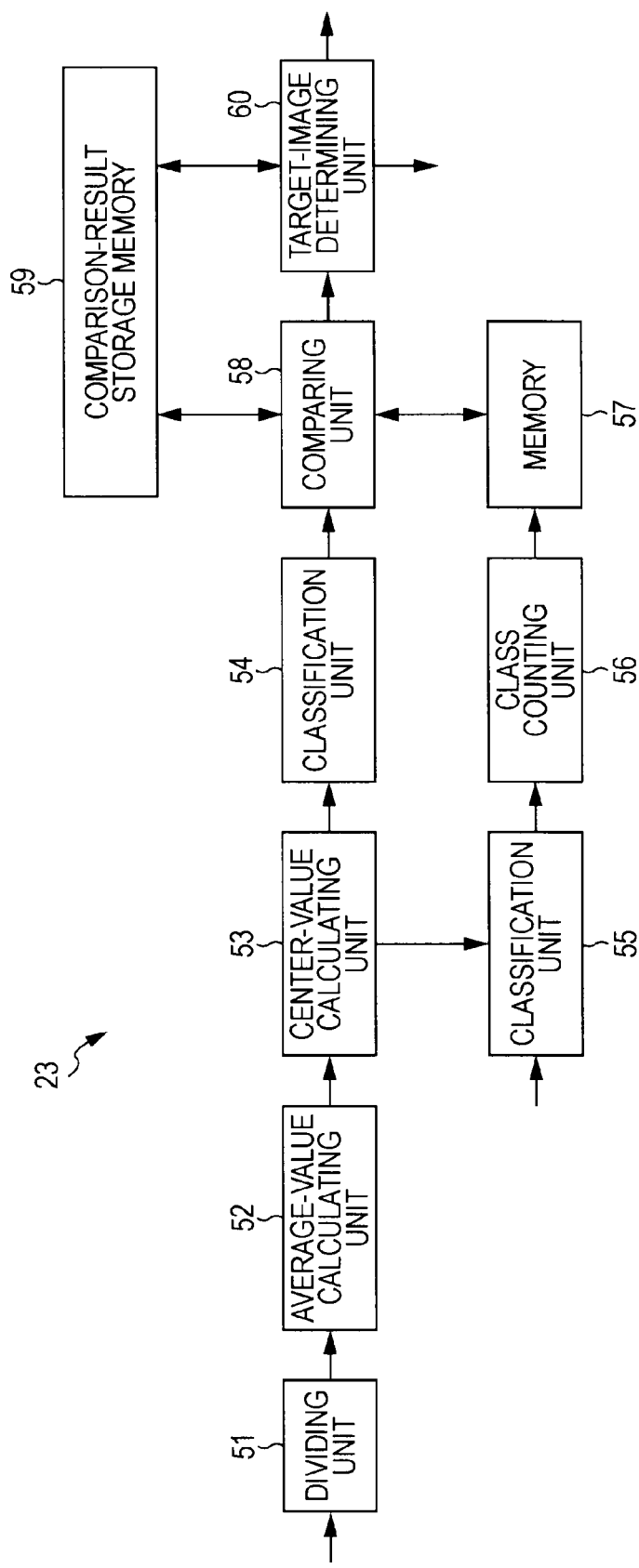
FIG. 3 illustrates an example configuration of a candidate selecting unit.
Figure 4:
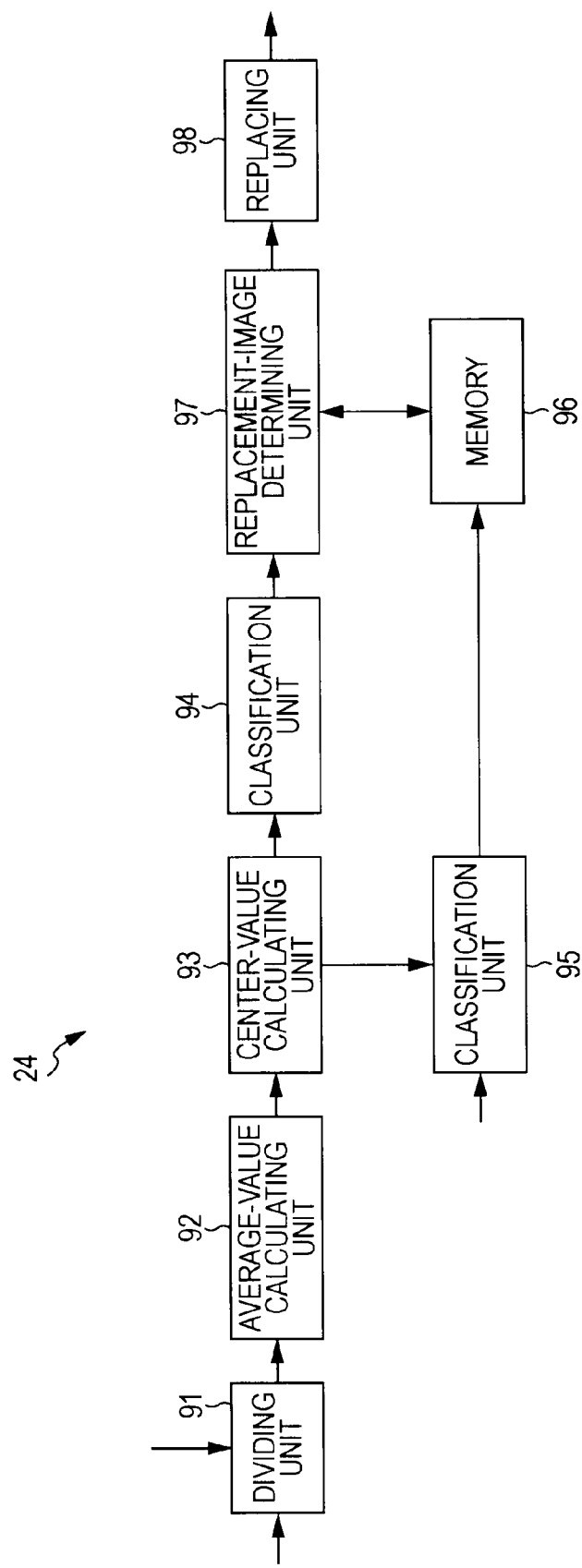
FIG. 4 illustrates an example configuration of a photo-mosaic generating unit.

FIGS. 3 and 4 illustrate details of the candidate selecting unit 23 and the photo-mosaic generating unit 24 illustrated in FIG. 2.

FIG. 3 illustrates a detailed configuration example of the candidate selecting unit 23.

The candidate selecting unit 23 includes a dividing unit 51, an average-value calculating unit 52, a center-value calculating unit 53, a classification unit 54, a classification unit 55, a class counting unit 56, a memory 57, a comparing unit 58, a comparison-result storage memory 59, and a target-image determining unit 60.

The dividing unit 51 divides each target candidate image from the recording unit 22 into multiple blocks and sends these blocks to the average-value calculating unit 52. The average-value calculating unit 52 calculates the average value of pixel values of pixels in each block sent from the dividing unit 51 as a characteristic color value associated with color of the block. This average value represents the average color of the pixels constituting the block.

The average value of a block is an example representative value of a block. The representative value may instead be a pixel value of a pixel at coordinates of the center of a block or the average value of pixel values of pixels at predetermined coordinates in a block.

The center-value calculating unit 53 uses the average values of the blocks from the average-value calculating unit 52 to calculate the center value used for classification, which is a characteristic color value associated with color of each class. The center value represents a representative (average) color of a block in the corresponding class. The center-value calculating unit 53 sends the center values calculated for the classes and the average values of the blocks to the classification unit 54 and sends the center values of the classes to the classification unit 55.

The classification unit 54 places each block into a class using the center values of the classes sent from the center-value calculating unit 53 and the average value of the block and sends classification results to the class counting unit 56.

The classification unit 55 places each raw image from the image-database recording unit 21 into a class using the center values of the classes sent from the center-value calculating unit 53 and sends classification results to the class counting unit 56. The class counting unit 56 counts the number of classified raw images in each class on the basis of the classification results from the classification unit 55 and sends the number of raw images in the class to the memory 57 for recording.

The comparing unit 58 compares each classification result from the classification unit 54 with the number of raw images in each class recorded in the memory 57, compares the number of blocks and the number of raw images in each class, and sends comparison results to the comparison-result storage memory 59 for recording.

The target-image determining unit 60 selects target candidate images, one of which is to be a target image, on the basis of the comparison results for the plurality of target candidate images recorded in the comparison-result storage memory 59 and sends the selection result to the photo-mosaic generating unit 24 and the display control unit 25.

Configuration of Photo-Mosaic Generating Unit

FIG. 4 illustrates a more detailed example configuration of the photo-mosaic generating unit 24.

The photo-mosaic generating unit 24 includes a dividing unit 91, an average-value calculating unit 92, a center-value calculating unit 93, a classification unit 94, a classification unit 95, a memory 96, a replacement-image determining unit 97, and a replacing unit 98.

In FIG. 4, the dividing unit 91, the average-value calculating unit 92, the center-value calculating unit 93, the classification unit 94, and classification unit 95 are the same as the dividing unit 51, the average-value calculating unit 52, the center-value calculating unit 53, the classification unit 54, and the classification unit 55 in FIG. 3, respectively, and, thus, descriptions of these are not repeated.

The dividing unit 91, however, receives from the recording unit 22 a target image specified by the selection result from the target-image determining unit 60 and divides this into blocks. Furthermore, the target image divided into blocks is sent from the dividing unit 91 to the replacement-image determining unit 97 via the average-value calculating unit 92, the center-value calculating unit 93, and the classification unit 94. The classification unit 95 sends the raw images and the classification results of the classes for the raw images to the memory 96.

The memory 96 holds the classification results and the raw images from the classification unit 95 and sends these to the replacement-image determining unit 97 when requested. The replacement-image determining unit 97 uses the classification results for the classes and blocks from the classification unit 94, and the classification results for the classes and raw images from the memory 96 to determine the raw images to be assigned to the blocks. The replacement-image determining unit 97 sends the target image divided into blocks and the raw images assigned to the blocks to the replacing unit 98. The raw images assigned to the blocks are also referred to as "replacement images".

The replacing unit 98 generates a photo-mosaic image by replacing the blocks of the target image sent from the replacement-image determining unit 97 with the replacement images assigned to corresponding blocks and sends the photo-mosaic image to the display control unit 25.

Instead, however, the replacing unit 98 may generate a photo-mosaic image by receiving image numbers specifying the raw images assigned to the blocks from the replacement-image determining unit 97 and obtaining actual raw images corresponding to the image numbers for the blocks.

Description of Candidate Selection Processing

To create a photo-mosaic image, the user operates the image processing apparatus 11 to assign multiple target candidate images, which are candidates of a target image, and, among the target candidate images, selects one that is most suitable as the target image.

When the user carries out operation to instruct the start of processing for selecting a target image from the target candidate images, the image processing apparatus 11 starts candidate selection processing in response to the instruction.

Figure 5:
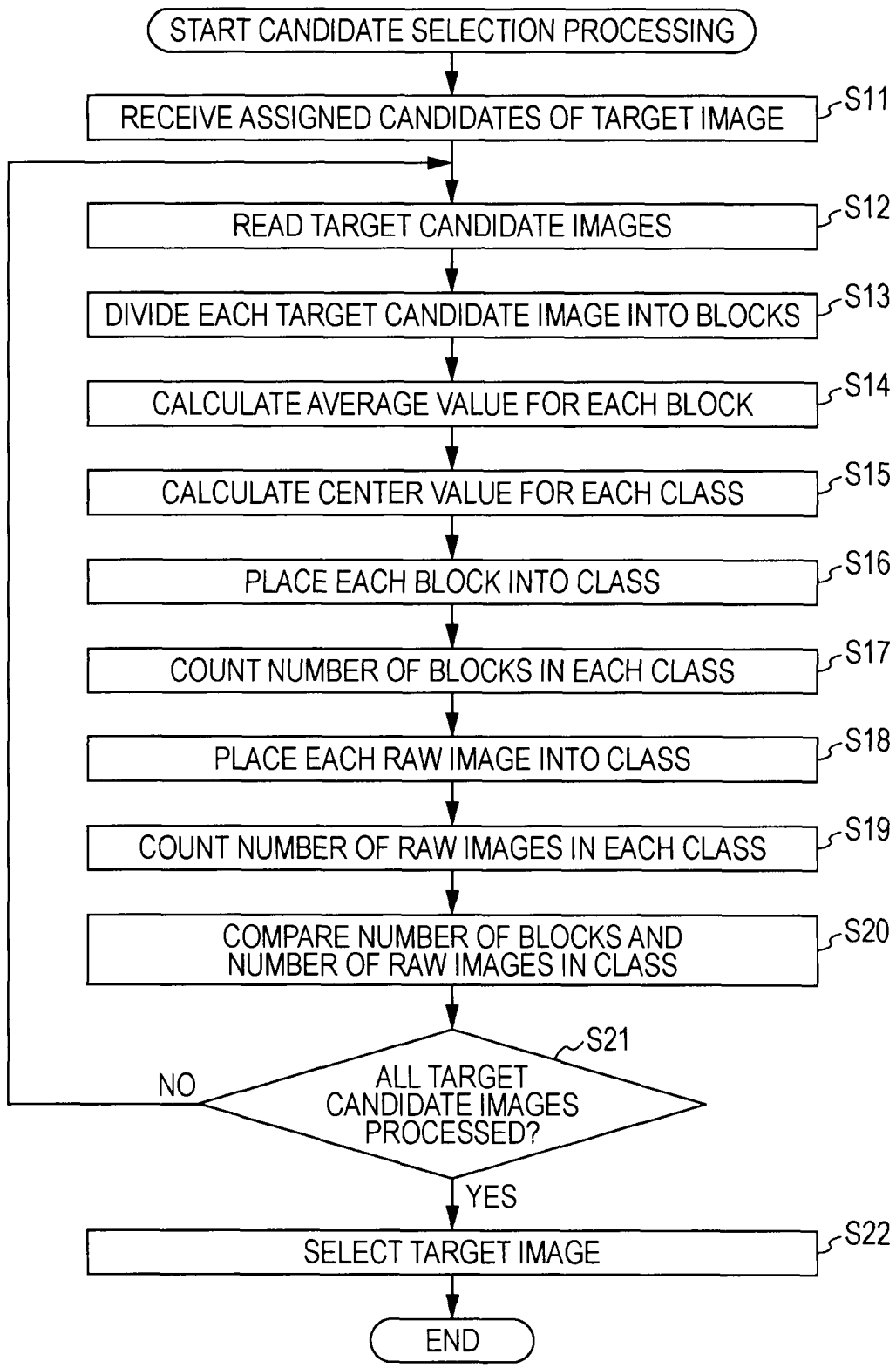
FIG. 5 is a flow chart illustrating candidate selection processing.

The candidate selection processing carried out by the image processing apparatus 11 will be described with reference to the flow chart in FIG. 5.

In Step S11, the candidate selecting unit 23 receives the assignment of target candidate images, which are candidates of a target image. The user operates the image processing apparatus 11 to assign multiple target candidate images. Upon receiving the assignment of the target candidate images through the operation by the user, the candidate selecting unit 23 instructs the dividing unit 51 to read in the assigned target candidate images.

In Step S12, the dividing unit 51 reads in one of the target candidate images assigned by the user from the recording unit 22 as a candidate of the target image.

In Step S13, the dividing unit 51 divides the read-in target candidate image into multiple blocks. For example, the target candidate image is divided evenly into a plurality of predetermined identical rectangular blocks. The dividing unit 51 sends the target candidate image divided into blocks to the average-value calculating unit 52.

In Step S14, the average-value calculating unit 52 calculates the average pixel value of pixels in each block sent from the dividing unit 51 and sends the average value of each block to the center-value calculating unit 53. For example, each pixel in the target candidate image has component pixel values of red (R), green (G), and blue (B). An average of each of the R, G, and B component pixel values is calculated. To reduce the amount of computation, pixels in a block are downsampled, and an average value is calculated from the downsampled block.

In Step S15, the center-value calculating unit 53 calculates the center value of each class using the average value of each block sent from the average-value calculating unit 52.

For example, when it is determined in advance that the number of classes is k, the center-value calculating unit 53 calculates the center value of each of the k classes using a k-means method. Specifically, the center-value calculating unit 53 first determines an initial value for the center value of each class. For example, a center value is determined for each of the R, G, and B components.

Then, the center-value calculating unit 53 calculates the distance between the center value of each class and the average value of each block for classification. The blocks in the target candidate image are placed into a class in which the calculated distance is closest (smallest). The distance is calculated by, for example, determining the square sum of the difference absolute values of the average value and center value the of the R, G, and B component pixel values or carrying out weighted addition of the differences of the component pixel values. In other words, the distance between a block and a class is a value representing the level of similarity between the average color (average value) of the block and the representative color (center value) of the class.

The center-value calculating unit 53 places the block into one of the classes and then determines a new center value for each class. That is, the average of the average values of the blocks in the class is calculated and the resulting average is set as a new center value. In this way, each block is classified in accordance with its center value; updating of the center value of each class is carried out a prescribed number of times; and the resulting center value is set as the final center value of the class.

After determining the center value of each class, the center-value calculating unit 53 sends the center values to the classification unit 55, in addition to sending the center values of the classes and the average values of the blocks to the classification unit 54.

In Step S16, the classification unit 54 uses the average values and the center values from the center-value calculating unit 53 to calculate the distances between the average values of the blocks and the center values of the classes and places each block into one of the k classes. Here, distance calculation and classification are carried out by a process similar to that carried out by the center-value calculating unit 53. That is, the distances are calculated by determining the square sum of the difference absolute values of the average values and center values the of the R, G, and B component pixel values. Each block is placed into a class at a closest distance.

In Step S17, the classification unit 54 counts the number of blocks placed into each class on the basis of the classification results and sends the counted number of blocks in each class to the comparing unit 58.

For example, when a block is to be placed into one of Class 1 to Class 5, the results of counting may be such that the number of blocks in Class 1 is 1503, in Class 2 is 3583, in Class 3 is 4552, in Class 4 is 142, and in Class 5 is 1842. The number of blocks in each class represents the number of raw images in the corresponding class used for generating a photo-mosaic image.

In Step S18, the classification unit 55 reads out raw images from the image-database recording unit 21 and places the read-out raw images into classes on the basis of the center values of the classes sent from the center-value calculating unit 53.

Specifically, the classification unit 55 calculates the average of pixel values of the pixels in each raw image as a characteristic value associated with color of the raw image and calculates the distance between the average value and the center value of each class. Here, the average value of a raw image is determined for each of the R, G, and B components, and the distance between an average value and a center value is calculated by a method similar to that used by the classification unit 54.

Next, the classification unit 55 places raw images to classes of which the determined distances are smaller than a predetermined threshold. For example, when the distance between the average value of a specific raw image and the center value of Class 1 and the distance between the average value of a specific raw image and the center value of Class 2 are both smaller than the threshold, the raw image is placed into both Class 1 and Class 2.

On the other hand, when the distances between the average value of the raw image and the center values of all classes are not smaller than the threshold value, the raw image is placed into none of the classes. That is, the raw image does not belong to any of the classes because the average color of the raw image is dissimilar to the color of any of the classes.

The threshold of the distance may vary when necessary, and a raw image may be placed into one class or may not be placed into any of the classes. When a raw image is not placed into any of the classes, the raw image will be placed into a class of which the distance is most similar to the distance of the raw image among the classes in which the distance is smaller than the threshold.

After classifying each raw image, the classification unit 55 sequentially sends the classification results to the class counting unit 56.

To reduce the amount of computation, pixels in a raw image may be downsampled and the average value may be calculated from the downsampled raw image. During the first processing, an average value of each raw image may be calculated and recorded, and during subsequent processing, the recorded average values of the raw images may be used. In this way, classification of raw images can be carried out more quickly.

In Step S19, the class counting unit 56 counts the number of raw images in each class on the basis of a classification result from the classification unit 55 and sends the determined number of raw images for each class to the memory 57 for recording.

For example, when there are five classes from Class 1 to Class 5, the results of counting may be such that the number of raw images in Class 1 is 102, in Class 2 is 4503, in Class 3 is 7532, in Class 4 is 180, and in Class 5 is 532. The number of raw images in each class represents the number of raw images that can be used as replacement images for blocks in each class.

In Step S20, the comparing unit 58 compares the number of blocks and number of raw images in each class using the classification result of blocks in each class sent from the classification unit 54 and the classification results of raw images in each class recorded in the memory 57.

That is, the difference between the number of blocks and number of raw images in each class is determined for each class. For example, when there are five classes from Class 1 to Class 5, the comparison results may be such that the difference in Class 1 is −501, in Class 2 is 920, in Class 3 is 2980, in Class 4 is 38, and in Class 5 is −606.

Here, a positive difference in a class indicates that the number of raw images is larger than the number of blocks in the class, whereas a negative difference indicates that the number of raw images is smaller than the number of blocks in the class. That is, the difference in each class represents an excess or a shortage in the number of raw images with respect to the number of blocks in the class. Specifically, a positive difference represents an excess in raw images, whereas a negative difference represents a shortage in raw images.

The comparing unit 58 determines a difference in each class for each target candidate image to be processed and sends these differences as comparison results to the comparison-result storage memory 59 for recording. For example, information specifying the target candidate images, the center values of the classes, and the differences (excess or shortage) in the classes are recorded in the comparison-result storage memory 59 as comparison results. The comparing unit 58 can obtain the center values of the classes from the classification unit 54.

In Step S21, the candidate selecting unit 23 determines whether or not processing has been carried out on all target candidate images assigned as candidates of a target image by the user. For example, when the results of comparing the numbers of blocks and the numbers of raw images in all target candidate images are recorded in the comparison-result storage memory 59, it is determined that processing has been carried out.

In Step S21, when it is determined that processing has not been carried out on all target candidate images, the process returns to Step S12, and the processing described above is repeated. That is, the next target candidate image is read in, and the number of blocks and number of raw images in each class are compared for this target candidate image.

On the other hand, in Step S21, when it is determined that processing has been carried out on all target candidate images, the comparing unit 58 instructs the target-image determining unit 60 to select a target image, and then the process proceeds to Step S22.

In Step S22, the target-image determining unit 60 reads out from the comparison-result storage memory 59 the comparison results for the target candidate images assigned as candidates of a target image and selects, on the basis of the comparison results, a target candidate image that is to be a target image.

For example, the target-image determining unit 60 selects from the multiple target candidate images a target candidate image that has the least shortage in usable raw images with respect to the blocks in the target candidate image since such a target candidate image provides a photo-mosaic image with best quality.

Specifically, for example, five classes from Class 1 to Class 5 are provided, and the comparison results for a prescribed target candidate image are such that the difference of Class 1 is −501, the difference of Class 5 is −606, and the differences of the other classes are positive values.

In such a case, the target-image determining unit 60 determines the sum of the absolute values of the negative differences among the differences of classes for the prescribed target candidate image, i.e., 1107 (=501+606), and determines the sum of the absolute values of the negative differences for all other target candidate images.

The sums determined in this way represent shortages in the raw images when a photo-mosaic image is to be generated by assigning raw images without duplication to blocks in the same class when the prescribed target candidate image is to be used as a target image. Thus, by using a target candidate image having a small sum as the target image, raw images (replacement images) is less likely to be used twice or more, and, therefore, a photo-mosaic image with better quality can be acquired.

Thus, the target-image determining unit 60 selects, as a target image, the target candidate image having the smallest sum (shortage) among the multiple target candidate images assigned by the user.

When there are multiple target candidate images each having a smallest sum, i.e., when there are multiple target candidate images having no shortage, e.g., having a sum of zero, the target-image determining unit 60 further selects a target candidate image having the largest excess in raw images among the target candidate images.

Specifically, the target-image determining unit 60 calculates the sum of the positive differences among the differences of classes of the target candidate images as the excess in raw images. Then, the target-image determining unit 60 selects the target candidate images having the most excess as a target image.

When the number of usable raw images is large than the blocks in each class, the possibility of the raw images assigned to the blocks having colors similar to the blocks increases. Thus, a photo-mosaic image with better quality can be acquired.

Therefore, the target-image determining unit 60 extracts a target candidate images having the least shortage in raw images from the target candidate images specified by the user. Then, as a result, when multiple target candidate images are extracted, the target-image determining unit 60 further selects a target candidate images having the largest excess in raw images from the extracted target candidate images as a final target image.

In the above-described example of a comparison between the number of blocks and the number of raw images, a target image is selected merely on the basis of a shortage or an excess in raw images. Instead, however, a target image may be selected on the basis of an average percentage of shortage in raw images. In such a case, for example, the comparing unit 58 records, in addition to the comparison results, the number of blocks in each class in the comparison-result storage memory 59.

Specifically, for example, five classes from Class 1 to Class 5 are provided, and the comparison results for a prescribed target candidate image are such that the difference of Class 1 is −501, the difference of Class 5 is −606, and the differences of the other classes are positive values. In such a case, together with the comparison results, the number of blocks of the classes, e.g., the number of blocks of Class 1, which is 1503, and the number of blocks of Class 5, which is 1842, are recorded in the comparison-result storage memory 59.

Then, as an average percentage of shortage in the raw images (0.33=((501/1503)+(606/1842))/2) is determined and compared with the average percentage of shortage in other target candidate images for selecting a final target image.

As described above, after the final target image is selected from the multiple candidates, the target-image determining unit 60 sends the selection result to the dividing unit 91 of the photo-mosaic generating unit 24 and the display control unit 25. Then, the candidate selection processing is ended.

For example, the selection result output from the target-image determining unit 60 is displayed on the display unit 26 by the control of the display control unit 25. Thus, by viewing the selection result displayed on the display unit 26, the user can easily know which target candidate image among the multiple target candidate images specified by the user himself to select to acquire a photo-mosaic image with best quality.

In this way, the image processing apparatus 11 classifies the blocks and the raw images of the multiple target candidate images specified by the user, compares the number of blocks and the number of raw images for each class, and selects a target image on the basis of the comparison results of the target candidate images.

In this way, by selecting a target candidate image to be assigned as a target image on the basis of the comparison results of the target candidate images and outputting the selection result, a photo-mosaic image can be generated from a target image that less likely contains replacement images that are used twice or more. In this way, for example, when a target candidate image is selected from multiple target candidate images as a target image and a photo-mosaic image is generated using this target image, a photo-mosaic image with better quality can be acquired.

For example, the image database may include many raw images having a biased color distribution, i.e., including similar colors, or may include a small number of raw images. In such a case, in the past, the user could not know which image to select as a target image to acquire a photo-mosaic image with good visual quality. In addition, no measure was taken for replacement images that were used twice or more. Thus, the user could not generate a photo-mosaic image with high quality.

In contrast, with the image processing apparatus 11, even when there is a bias in the raw images constituting the image database and/or when the number of raw images is small, the target image that provides a photo-mosaic image with the best quality is selected and displayed when the image database is used. Thus, the user can generate a photo-mosaic image using the displayed target image to acquire a photo-mosaic image with better quality, regardless of the image database used.

Description of Processing for Photo-Mosaic Image Generation

When the selection result of an optimal target candidate image to be assigned as a target image is displayed on the display unit 26, the user operates the image processing apparatus 11 to generate a photo-mosaic image from the target image, which is the selected target candidate image.

Figure 6:
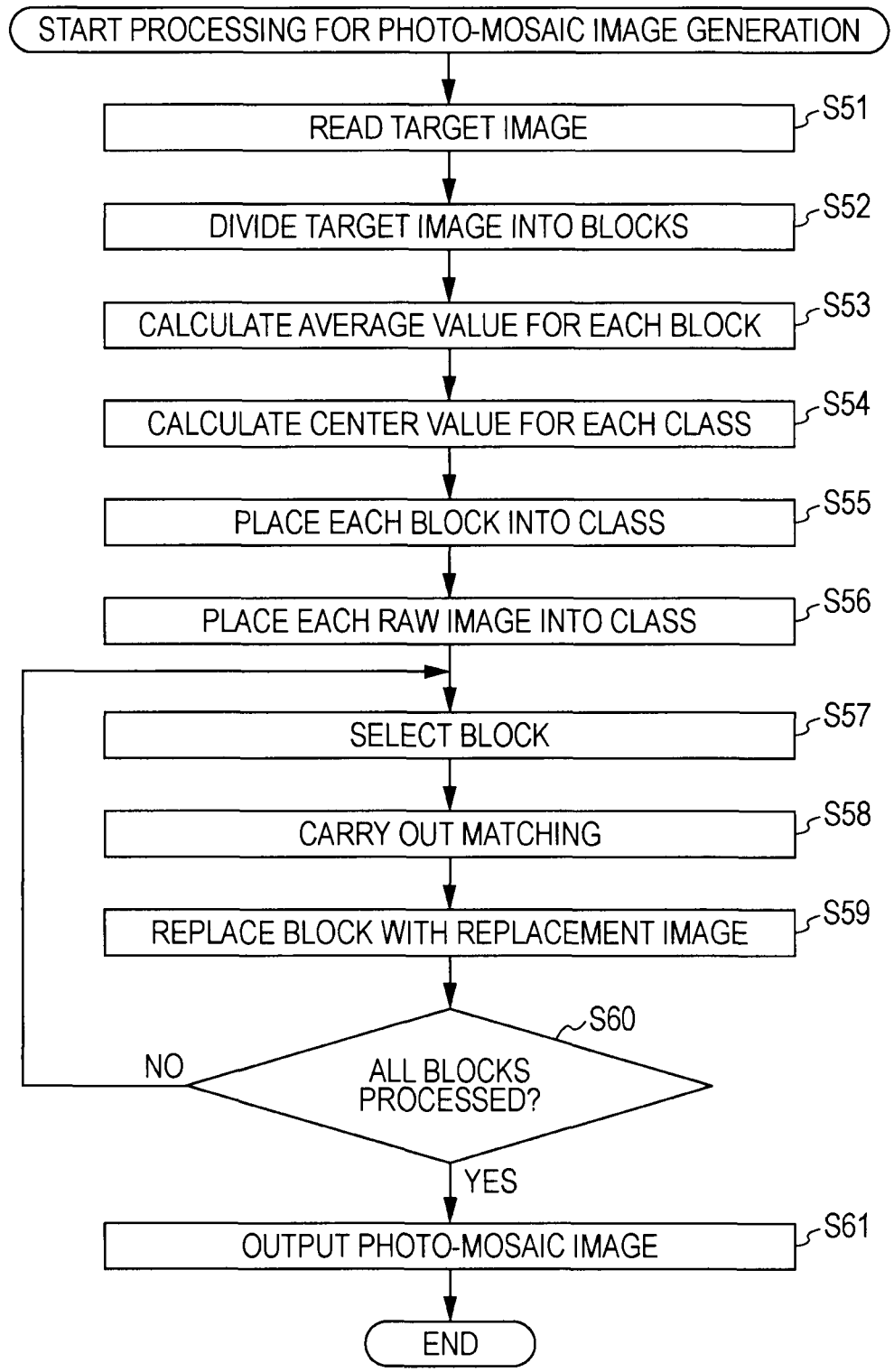
FIG. 6 is a flow chart illustrating processing of generating a photo-mosaic image.

When the user instructs the generation of a photo-mosaic image, the image processing apparatus 11 starts processing for photo-mosaic image generation in accordance with the instruction to generate the photo-mosaic image. Next, the processing for photo-mosaic image generation carried out by the image processing apparatus 11 will be described with reference to the flow chart in FIG. 6. The processing for photo-mosaic image generation may be started without the operation by the user, after the target image is selected through the candidate selection processing illustrated in FIG. 5.

In Step S51, the dividing unit 91 reads out from the recording unit 22 a target candidate image specified by the selection result sent from the target-image determining unit 60 as a target image.

Then, the processing of Steps S52 to S56 is carried out. Since Steps S52 to S56 are similar to Steps S13 to S16 and Step S18 in FIG. 5, respectively, descriptions thereof are not repeated here.

In other words, the blocks in the target image are placed into classes, and the classification results and the target image divided into blocks are sent from the classification unit 94 to the replacement-image determining unit 97. Furthermore, the raw images read out from the image-database recording unit 21 are placed into classes, and the classification results and the read-out raw images are sent from the classification unit 95 to the memory 96 for recording. Raw images that are not placed to classes by the classification unit 95 are not used for generating a photo-mosaic image.

Then, in Step S57, the replacement-image determining unit 97 selects a block in the target image.

In Step S58, the replacement-image determining unit 97 uses the raw images recorded in the memory 96 and the classification results of the raw images to match the selected block and the raw images to select a raw image to be assigned to the block.

Specifically, the replacement-image determining unit 97 extracts from the raw images recorded in the memory 96 a raw image that belong to the same class as the block to be processed and that is not yet selected as a replacement image to be replaced with another block in the class.

In this way, by extracting only raw images that belong to the same class as a block to be processed and carrying out processing to extracted raw images, raw images that are less similar to the block and that are less likely to be used as replacement images can be excluded, and, thus, adequate raw images can be selected more quickly. Furthermore, even within the same class, by excluding raw images that have been used as replacement images of other blocks, the raw images can be prevented from being used twice or more, and, thus, a photo-mosaic image with better quality can be acquired.

After raw images are extracted in this way, the replacement-image determining unit 97 matches each extracted raw image with the block to be processed. In other words, the replacement-image determining unit 97 calculates a difference ΔC between a pixel in a block and a pixel in a raw image at the same position as the pixel in the block.

$$\Delta C = \sqrt{\left(2 + \frac{r}{256}\right) \times \Delta R^2 + 4 \times \Delta G^2 + \left(2 + \frac{255-r}{256}\right) \times \Delta B^2} \quad (1)$$

Here, r, ΔR, ΔG, and ΔB in Expression 1 are determined by Expressions 2 to 5.

$$r = \frac{C1(R) + C2(R)}{2} \quad (2)$$

$$\Delta R = C1(R) - C2(R) \quad (3)$$

$$\Delta G = C1(G) - C2(G) \quad (4)$$

$$\Delta B = C1(B) - C2(B) \quad (5)$$

In Expressions 2 to 5, C1(R), C1(G), and C1(B) represent pixels values of the R, G, and B components, respectively, of the pixel in the block. Similarly, in Expressions 2 to 5, C2(R), C2(G), and C2(B) represent the pixels values of the R, G, and B components, respectively, of the pixel in the raw image.

The difference ΔC determined in this way is a value obtained by performing weighted addition of the values obtained by squaring the differences of the components in the pixel in the target image and pixel in the raw images. In other words, the difference ΔC is the distance between the pixel in the target image and the pixel in the raw image.

Thus, the smaller the difference ΔC is, the more similar the colors of the pixel in the block of the target image and the pixel in the raw image at the same positions. The replacement-image determining unit 97 determines the difference ΔC for each pixel and calculates the sum ΣΔC of the determined differences ΔC. The smaller the sum ΣΔC is, the more similar the color configurations (distributions) of the raw image and the block to be processed.

Therefore, by using a raw image having a small sum ΣΔC as a replacement image of the block to be processed, a photo-mosaic image with better quality can be acquired. Accordingly, the replacement-image determining unit 97 selects a raw image having a smallest sum ΣΔC in the extracted raw images and sends the selected raw image to the replacing unit 98 as a replacement image. The replacement-image determining unit 97 also sends the target image divided into blocks to the replacing unit 98.

To reduce the amount of computation for the sum ΣΔC, the differences ΔC of the pixels may be calculated after pixels in the blocks and raw images are downsampled and the blocks and raw images are reduced by the same reduction rate.

When extracting a raw image to be matched, it may be set such that the raw image that has been used once as a replacement image is not reused only in the vicinity of the block it replaced (for example, near 24), instead of entirely prohibiting the use of the raw image for a second time. In this way, a decrease in the quality of the photo-mosaic image can be prevented.

When the number of raw images in the same class is smaller than the number of blocks in the class and when all of the raw images have been used as replacement images, all raw images in the class may be processed again. In other words, all raw images may be processed, and replacement images of subsequent blocks are selected in order from these raw images. In such a case, the raw images selected as replacement images may or may not be prohibited from being selected as replacement images of subsequent blocks.

As described above, when the replacement image of the block to be processed is sent to the replacing unit 98, in Step S59, the replacing unit 98 replaces the block to be processed in the target image with the replacement image sent from the replacement-image determining unit 97.

In Step S60, the photo-mosaic generating unit 24 determines whether or not processing is carried out on all blocks in the target image. For example, when a photo-mosaic image is generated by replacing all blocks with replacement images, it is determined that processing has been carried out on all blocks.

In Step S60, when it is determined that processing has not been carried out on all blocks, the process returns to Step S57, and the processing described above is repeated. That is, the next block is selected and is replaced with a raw image.

In contrast, in Step S60, when it is determined that processing has been carried out on all blocks, in Step S61, the replacing unit 98 outputs the photo-mosaic image acquired by replacing the blocks with the replacement images to the display control unit 25. Then, the photo-mosaic image is displayed on the display unit 26 by the control of the display control unit 25, and processing for photo-mosaic image generation is ended.

In this way, the image processing apparatus 11 generates a photo-mosaic image using a target image selected by the candidate selecting unit 23. In this way, by generating a photo-mosaic image by using a target image selected by the candidate selecting unit 23 to match raw images placed into the same class with blocks, a photo-mosaic image with better quality can be acquired through simpler processing.

Second Embodiment
Configuration of Candidate Selecting Unit

In the above, an example in which a center value of each class is calculated from target candidate images is described. Instead, however, the center values of the classes may be determined in advance.

For example, when the subject in a target candidate image is specified in advance, for example, to be a person's face, a value that represents a characteristic color of the subject, such as a color of the skin, black, green, white, or red, can be set as a center value so that calculation of a center value is not necessary each time processing is carried out. In this way, the processing speed can be increased. Furthermore, in such a case, by carrying out classification based on the center values set in advance for the raw images in the image database, classification of the raw images will not be necessary each time processing is carried out.

Figure 7:
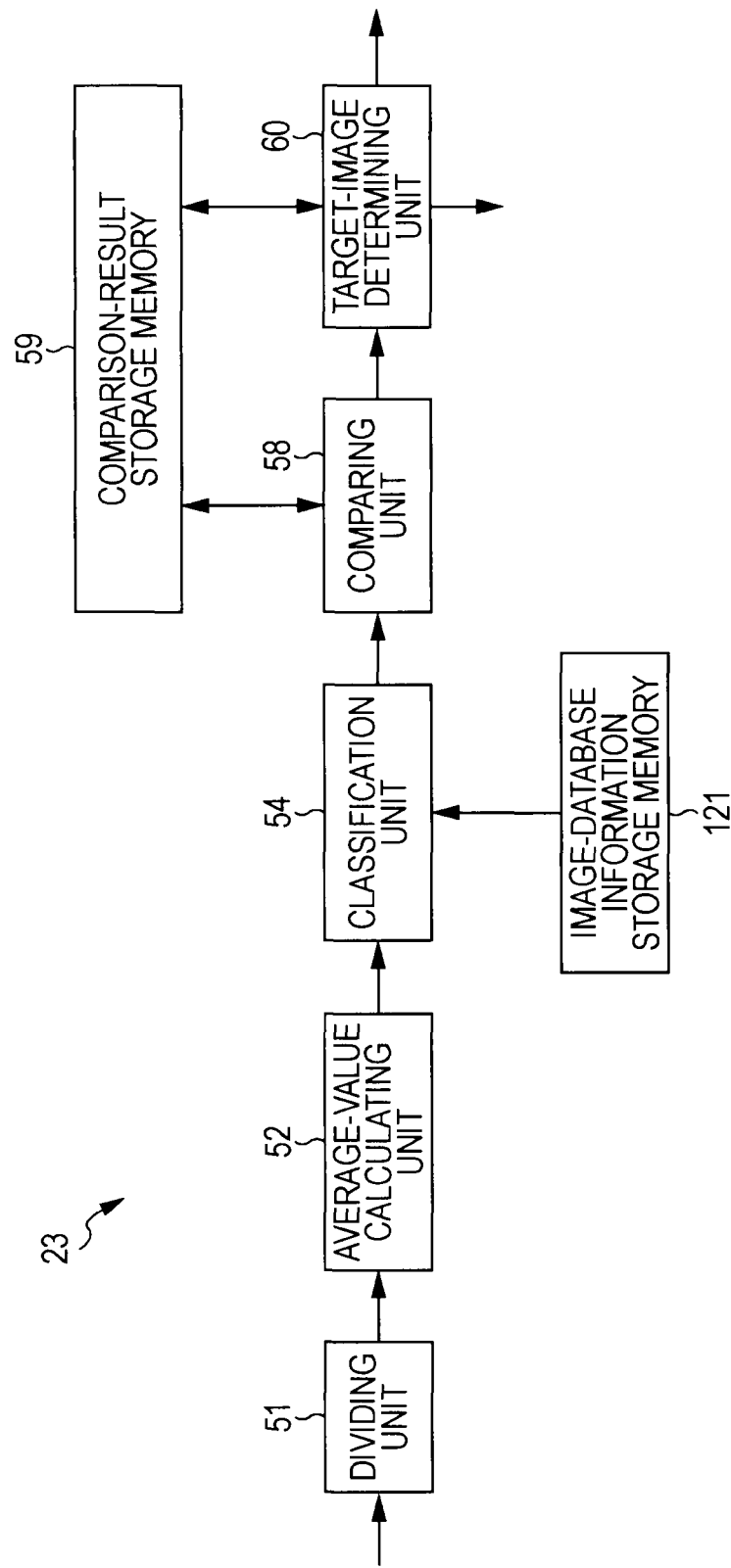
FIG. 7 illustrates another example configuration of a candidate selecting unit.
Figure 8:
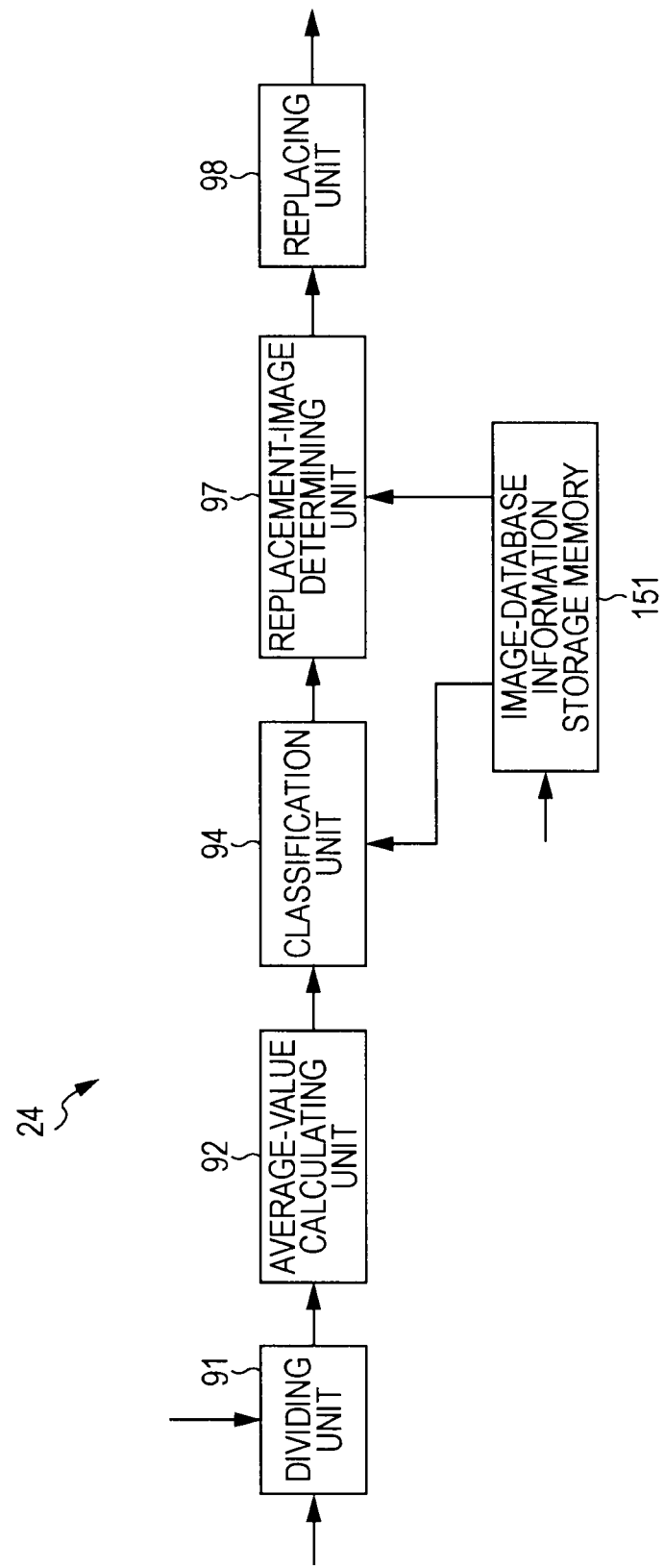
FIG. 8 illustrates another example configuration of a photo-mosaic generating unit.

In this way, when the center values of the classes are set in advance, the candidate selecting unit 23 and the photo-mosaic generating unit 24 included in the image processing apparatus 11 are configured as illustrated in FIGS. 7 and 8, respectively.

FIG. 7 illustrates an example configuration of the candidate selecting unit 23. In FIG. 7, the parts that correspond to those in FIG. 3 are indicated by the same reference numerals, and descriptions thereof are not repeated.

The candidate selecting unit 23 in FIG. 7 is the same as that in FIG. 3 except that an image-database information storage memory 121 is provided but the center-value calculating unit 53, the classification unit 55, the class counting unit 56, and the memory 57 are not provided.

The image-database information storage memory 121 holds predetermined center values of the classes and the classification results of raw images using the center values.

The classification unit 54 obtains the center values of the classes and the classification results of the raw images from the image-database information storage memory 121. The classification unit 54 uses the obtained center values to classify the blocks in target candidate images and sends the classification results of the blocks and the classification results of the raw images to the comparing unit 58.

With reference to FIG. 7, an example in which the raw images are classified in advance is described. However, when processing is carried out for the first time, the candidate selecting unit 23 may used the predetermined center values to carry out classification of the raw images once, and the results may be recorded in the image-database information storage memory 121. In such a case, in processing carried out for a second time or more, classification results of the raw images are read out from the image-database information storage memory 121.

Configuration of Photo-Mosaic Generating Unit

FIG. 8 illustrates an example configuration of the photo-mosaic generating unit 24 for a case in which the center values of the classes are determined in advance. In FIG. 8, the parts that correspond to those in FIG. 4 are indicated by the same reference numerals, and descriptions thereof are not repeated.

The photo-mosaic generating unit 24 in FIG. 8 is the same as that in FIG. 4 except that an image-database information storage memory 151 is provided but the center-value calculating unit 93, the classification unit 95, and the memory 96 are not provided.

The image-database information storage memory 151 holds predetermined center values of the classes and the classification results of raw images using the center values. The image-database information storage memory 151 reads out raw images from the image-database recording unit 21 and records the read-out raw images.

The classification unit 94 obtains the center values of the classes from the image-database information storage memory 151 and classifies the blocks using the center values and the average values of the blocks from the average-value calculating unit 92. The classification unit 94 sends a target image sent from the average-value calculating unit 92 and divided into blocks and the classification results of the blocks to the replacement-image determining unit 97.

Description of Candidate Selection Processing

Next, candidate selection processing and processing for photo-mosaic image generation by the candidate selecting unit 23 and the photo-mosaic generating unit 24, which are configured as illustrated in FIGS. 7 and 8, respectively, will be described.

Figure 9:
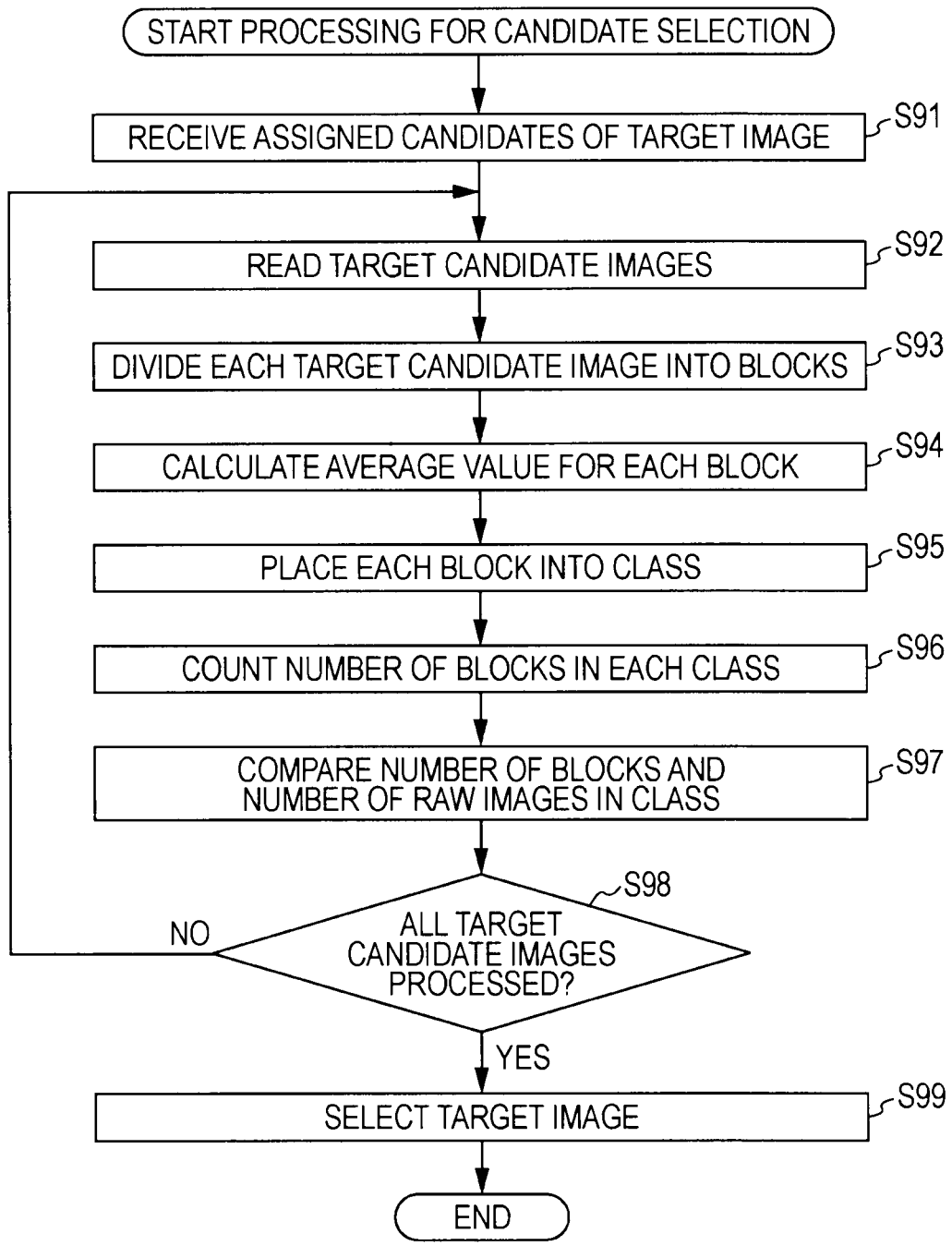
FIG. 9 is a flow chart illustrating candidate selection processing.

The candidate selection processing carried out by the image processing apparatus 11 will be described with reference to the flow chart illustrated in FIG. 9. Since Steps S91 to S94 are similar to Steps S11 to S14 in FIG. 5, respectively, descriptions thereof are not repeated here.

In Step S95, the classification unit 54 obtains the center values of the classes from the image-database information storage memory 121 and places the block into a predetermined class using the average value of each block in the target candidate image sent from the average-value calculating unit 52.

In Step S96, for each class, the classification unit 54 counts the number of blocks classified into the class on the basis of the classification result of each block. Then, the classification unit 54 obtains the classification results of the raw images from the image-database information storage memory 121 and sends the number of blocks in each class and the classification results of the raw images to the comparing unit 58.

Then, Steps S97 to S99 are carried out, and the candidate selection processing ends. Since Steps S97 to S99 are similar to Steps S20 to S22, descriptions thereof are not repeated.

In this way, the image processing apparatus 11 classifies the blocks and the raw images of the multiple target candidate images specified by the user, compares the number of blocks and the number of raw images for each class, and selects a target image on the basis of the comparison results of the target candidate images.

In this way, by selecting target candidate images on the basis of the comparison results of the target candidate images, an image that provides a photo-mosaic image with high quality can be used as a target image. Since classification of the blocks is carried out on the basis of predetermined center values, when the subject of the target candidate images is determined in advance to a certain extent, classification of the raw images and calculation of the center values do not have to be carried out each time processing is carried out. In this way, selection of a target image can be carried out more quickly.

Description of Processing for Photo-Mosaic Image Generation

Figure 10:
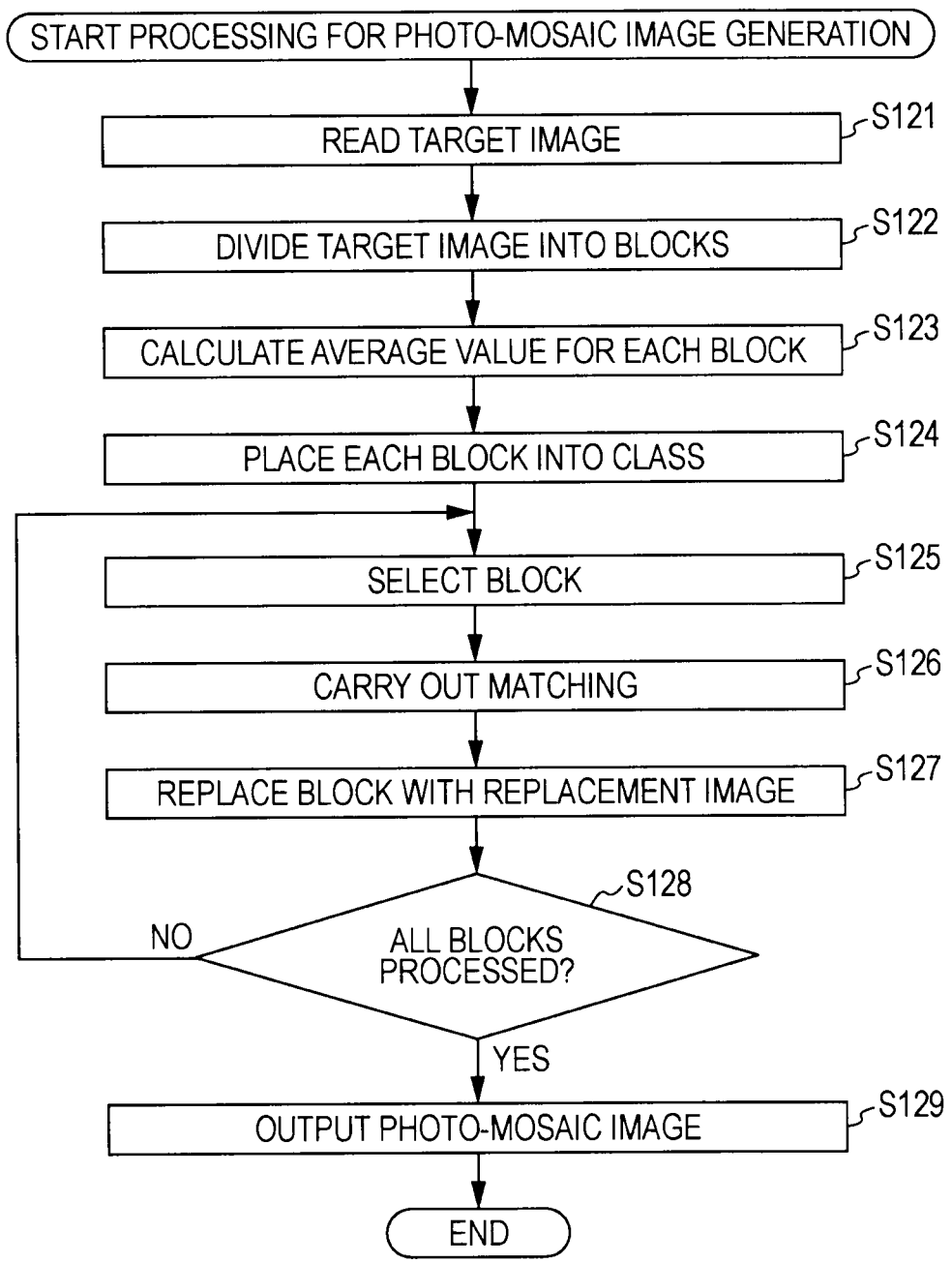
FIG. 10 is a flow chart illustrating processing of generating a photo-mosaic image.

With reference to the flow chart illustrated in FIG. 10, processing for photo-mosaic image generation by the image processing apparatus 11 will be described. Since Steps S121 to S123 are similar to Steps S51 to S53 in FIG. 6, respectively, descriptions thereof are not repeated here.

In Step S124, the classification unit 94 obtains the center values of the classes from the image-database information storage memory 151 and classifies each block using the obtained center values and the average value of each block from the average-value calculating unit 92.

Then, the classification unit 94 sends the classification results of the blocks and the target image divided into blocks to the replacement-image determining unit 97. Furthermore, the image-database information storage memory 151 reads out raw images from the image-database recording unit 21 and records the read-out raw images.

Then, Steps S125 to 5129 are carried out, and the processing for photo-mosaic image generation ends. Since these steps are similar to Steps S57 to S61 in FIG. 6, respectively, descriptions thereof are not repeated here.

The replacement-image determining unit 97 uses the raw images recorded in the image-database information storage memory 151 and the classification results of the raw images to match the blocks sent from the classification unit 94.

In this way, by generating a photo-mosaic image by using a target image selected by the candidate selecting unit 23, the image processing apparatus 11 can generate a photo-mosaic image with better quality through simpler processing. In particular, by setting the center values of the classes in advance, calculation of the center values and classification of the raw images do not have to be carried out, and a photo-mosaic image can be acquired more quickly.

To acquire a photo-mosaic image with better quality, for raw images in which defocus, blurriness, and noise (hereinafter, referred to as defocus etc.) has occurred among the raw images constituting the image database, the defocus etc., in the raw images may be corrected.

In such a case, a mechanism that detects defocus etc. and a mechanism that corrects the detected defocus etc. are provided in the image processing apparatus 11. Then, when defocus etc. is detected in a raw image and when the size of the defocus etc. is smaller than a predetermined threshold, the raw image is recorded in the image-database recording unit 21 after the defocus etc. is eliminated through filter processing for eliminating the defocus etc. On the other hand, when the size of the defocus etc. is larger than the predetermined threshold, the raw image is deleted so that it is not used as a replacement image.

When there is a shortage in the number of raw images in each class for generating a photo-mosaic image using the target image selected by the candidate selecting unit 23, the image processing apparatus 11 may acquire an image that belongs to the class in which there is a shortage via a network. In such a case, the image belonging to the class is an image of which the distance from the average of the pixels values of the pixels in the image to the center value of the class is smaller than or equal to the threshold. Moreover, the image should not, for example, violate any copyrights.

Furthermore, when the image processing apparatus 11 acquires a plurality of similar images via the network, only images with high quality that are not blurry nor defocused may be selected among the acquired images as raw images, and the remaining other images may not be used as raw images. This is the same for a case in which the raw images in the image-database recording unit 21 are similar.

Each block in each target candidate image and the raw images may be classified in advance, and the classification results may be recorded together with the center values of the classes. In such a case, by using the recorded classification results, the photo-mosaic generating unit 24 does not have to carry out classification each time processing is carried out, and thus, a photo-mosaic image can be acquired more quickly. Furthermore, by storing the division results of the blocks in each target candidate image, the photo-mosaic generating unit 24 can use the division results to obtained blocks, and thus, excess computation is not carried out.

The image processing apparatus 11 described above, for example, may be constituted of a computer or may be installed in an image-acquisition apparatus. Moreover, the image processing apparatus 11 may be installed in various types of electronics.

The raw images and the target candidate images described above are not limited to images (photographs) acquired by an image-acquisition apparatus and, instead, may be any type of image, such as images acquired by scanning pictures and computer graphics (CG).

In the above, a target candidate image is selected on the basis of the comparison results of the number of blocks and the number of raw images, i.e., the sum of the shortage in the number of raw images with respect to the blocks. Instead, however, a plurality of target candidate images may be displayed as the selection result.

In such a case, for example, the sum of the shortage and the threshold are compared for each target candidate image, and when there is a plurality of target candidate images of which the sum is smaller than or equal to the threshold, all of the target candidate images of which the sum is smaller than or equal to the threshold are displayed on the display unit 26 as selection results. Then, among these target candidate images, at least one target candidate image selected by the user is assigned as a final target image for generating a photo-mosaic image.

When a plurality of target candidate images is displayed on the display unit 26 as the selection results, the results may be displayed in different display formats depending on the sum, such as displaying those of which the sum is larger than or equal to the threshold in gray and highlighting those of which the sum is smaller than or equal to the threshold. Furthermore, as a display method of selection results of a plurality of target candidate images, the target candidate images may be displayed in an increasing order of the sum or the sums may be displayed as scores.

The series of processing described above may be carried out by hardware or software. When the series of processing is carried out by software, the programs constituting the software is installed from a program recording medium in a computer integrated with special hardware or a general-use personal computer capable of executing various functions by installing various programs.

Figure 11:
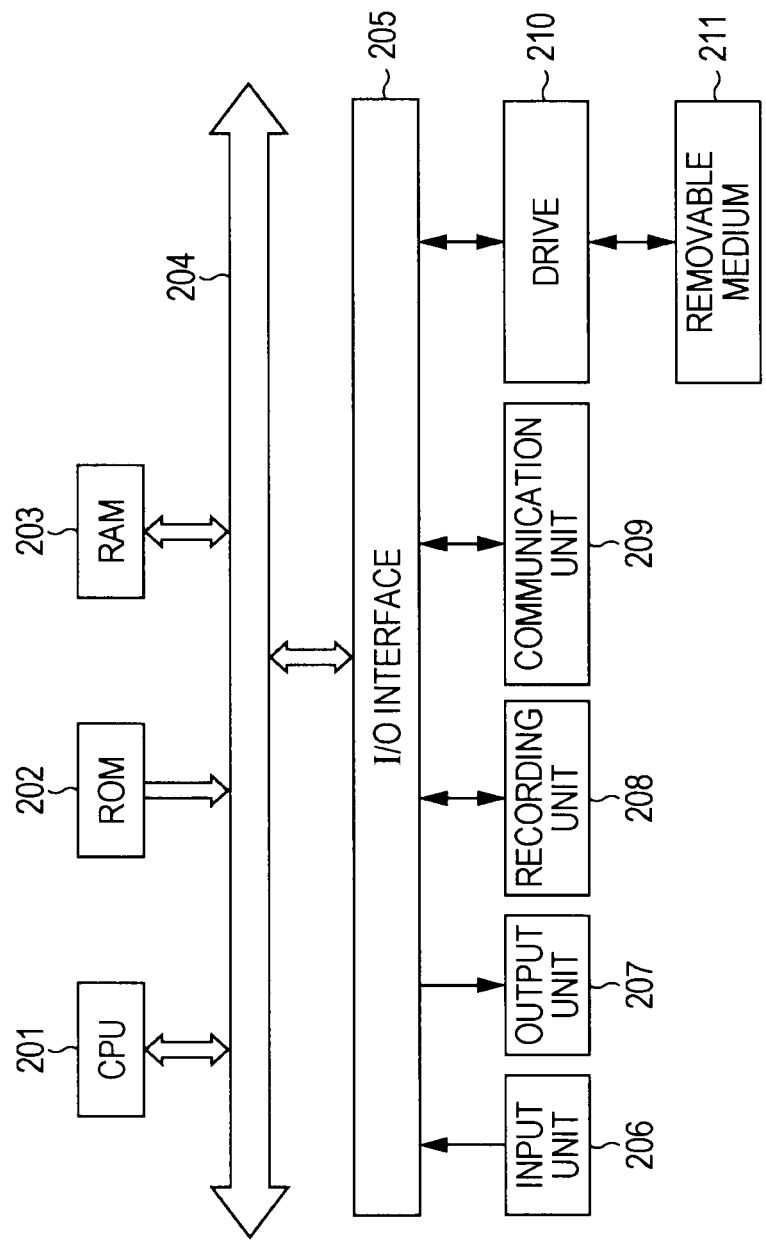
FIG. 11 illustrates an example configuration of a computer.

FIG. 11 is a block diagram illustrating an example hardware configuration of a computer that carries out the series of processing described above by a program.

In the computer, a central processing unit (CPU) 201, a read only memory (ROM) 202, and a random access memory (RAM) 203 are bi-directionally connected via a bus 204.

The bus 204 is also connected to an input/output (I/O) interface 205. The I/O interface 205 is connected to an input unit 206 including a keyboard, a mouse, a microphone, and so on, an output unit 207 including a display, a speaker, and so on, a recording unit 208 including a hard disk, non-volatile memory, and so on, a communication unit 209 including a network interface and so on, a drive 210 that drives a removable medium 211, such as a magnetic disk, an optical disk, a magneto-optical disk, or a semiconductor memory.

In a computer configured as described above, the CPU 201 carries out the series of processing described above by loading a program recorded in the recording unit 208 to the RAM 203 via the I/O interface 205 and the bus 204.

The program executed by the computer (CPU 201) is recorded on the removable disk 211, which is a packaged medium, such as a magnetic disk (including flexible disk), an optical disk (such as a compact disc-read only memory (CD-ROM) or a digital versatile disc (DVD)), a magneto-optical disk, or a semiconductor memory or is provided via a wire or wireless transmission medium, such as a local area network, the Internet, or digital satellite broadcasting.

Then, the program can be installed to the recording unit 208 via the I/O interface 205 by loading the removable medium 211 in the drive 210. Moreover, the program can be received by the communication unit 209 via a wire or wireless transmission medium and installed in the recording unit 208. Furthermore, the program can be installed in advance in the ROM 202 and/or the recording unit 208.

The program executed by the computer may be a program in which processing is carried out time-sequentially according to the order described in the embodiments or may be a program in which processing is carried out in parallel or at an arbitrary timing in response to a call.

The present invention is not limited to the embodiments described above, and various modifications may be made within the scope of the invention.

The present application contains subject matter related to that disclosed in Japanese Priority Patent Application JP 2009-204426 filed in the Japan Patent Office on Sep. 4, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   receiving means for receiving a plurality of target candidate images;
   dividing means for dividing each of the plurality of target candidate images, which are assigned as candidates of a target image, into blocks by dividing the target image into the blocks and replacing each of the blocks of the plurality target candidate images with a raw image selected from a plurality of raw images;

block classification means for placing each of the blocks of each of the plurality of target candidate images and each of the plurality of raw images into a class selected from a plurality of classes defined by a characteristic associated with color;

comparing means for comparing, for each of the classes, the number of blocks of each of the plurality of target candidate images in a class and the number of raw images in a same class; and selecting means for selecting a first target candidate image among the plurality of target candidate images to be assigned as the target image to create a photo-mosaic image on the basis of comparison results of the plurality of target candidate images obtained by the comparing means, wherein the block classification means places each of the blocks into one of the classes on the basis of a distance from a characteristic value of each of the blocks to a predetermined center value that is used for classification and represents a characteristic value of the characteristic of each of the classes.

2. The image processing apparatus according to claim 1, wherein the selecting means selects the first target candidate image on the basis of the comparison results for the classes indicating shortages in the raw images with respect to the blocks.

3. The image processing apparatus according to claim 2, wherein the selecting means selects, among the target candidate images, the first target candidate image having a smallest sum of shortages in the classes as the target image and, when multiple target candidate images has the smallest sum of shortages, selects one of the target candidate images having the smallest sum of shortages as the target image on the basis of the comparison results for the classes indicating excesses in the raw images with respect to the blocks.

4. The image processing apparatus according to claim 1, further comprising:
assignment receiving means for receiving an assignment of a plurality of target candidate images as candidates of the target image.

5. The image processing apparatus according to claim 1, further comprising:
block-characteristic value calculating means for calculating the characteristic value of the characteristic for each of the blocks on the basis of pixel values of pixels in each of the blocks in a target candidate image;
center-value calculating means for calculating, on the basis of the characteristic value of each of the blocks, the predetermined center value representing the characteristic value of the characteristic for each of the classes, the predetermined center value being calculated for a predetermined number of classes and used for classification; and
image classification means for calculating, on the basis of pixel values of pixels in the raw images, a characteristic value of the characteristic of each of the raw images and placing each of the raw images into a class on the basis of a distance between the class and the center value,
wherein the image classification means places each of the blocks into one of the classes on the basis of the characteristic value of the block and the distance between the class and the center values.

6. The image processing apparatus according to claim 1, further comprising:

block-characteristic value calculating means for calculating the characteristic value of the characteristic for each of the blocks on the basis of pixel values of pixels in each of the blocks in a target candidate image,
wherein each of the raw images is placed into a class in advance on the basis of the center values.

7. A method of image processing for an image processing apparatus including receiving means for receiving a plurality of target candidate images, dividing means for dividing each of the plurality of target candidate images, which are assigned candidates of a target image, into blocks by dividing the target image into the blocks and replacing each of the blocks of the plurality of target candidate images with a raw image selected from a plurality of raw images, block classification means for placing each of the blocks of each of the target candidate images and each of the plurality of raw images into a class selected from a plurality of classes defined by a characteristic associated with color, comparing means for comparing, for each of the classes, the number of blocks of the plurality of target candidate images in a class and the number of raw images in a same class, and selecting means for selecting a first target candidate image among the plurality of target candidate images to be assigned as the target image to create a photo-mosaic image on the basis of comparison results of the plurality of target candidate images obtained by the comparing means, the method comprising:
receiving a plurality of target candidate images;
dividing each of the plurality of target candidate images into the blocks by the dividing means;
placing each of the blocks of each of the target candidate images into one of the classes by the block classification means;
comparing the number of blocks and the number of raw images in each of the classes by the comparing means; and
selecting one of the plurality of target candidate images on the basis of the comparison results by the selecting means,
wherein the block classification means places each of the blocks into one of the classes on the basis of a distance from a characteristic value of each of the blocks to a predetermined center value that is used for classification and represents a characteristic value of the characteristic of each of the classes.

8. An image processing apparatus comprising:
a receiving unit configured to receive a plurality of target candidate images;
a dividing unit configured to divide each of the plurality of target candidate images, which are assigned as candidates of a target image, into blocks by dividing the target image into the blocks and replacing each of the blocks of the plurality of target candidate images with a raw image selected from a plurality of raw images;
a block-class classification unit configured to place each of the blocks of each of the plurality target candidate images and each of the plurality of raw images into a class selected from a plurality of classes defined by a characteristic associated with color;
a comparing unit configured to compare, for each of the classes, the number of blocks of each of the plurality of target candidate images in a class and the number of raw images in a same class and store comparison results in a memory; and
a selecting unit configured to select a first target candidate image among the plurality of target candidate images to be assigned as the target image to create a photo-mosaic image on the basis of the comparison results of the plurality of target candidate images obtained by the comparing unit, wherein the block classification unit places each of the blocks into one of the classes on the basis of a distance from a characteristic value of each of the blocks to a predetermined center value that is used for classification and represents a characteristic value of the characteristic of each of the classes.

9. An image processing apparatus comprising:
a dividing unit configured to divide a target candidate image, which is assigned as a candidate of a target image, into blocks when a photo-mosaic image is generated by dividing the target image into the blocks and replacing each of the blocks of the target candidate image with a raw image selected from a plurality of raw images;
a block-class classification unit configured to place each of the blocks in the target candidate image into a class selected from a plurality of classes defined by a characteristic associated with color;
a comparing unit configured to compare, for each of the classes, the number of blocks in the target candidate image in a class and the number of raw images in the same class; and
a selecting unit configured to select a first target candidate image among a plurality of target candidate images to be assigned as the target image on the basis of comparison results of the target candidate images obtained by the comparing unit,
wherein the selecting unit selects the first target candidate image on the basis of the comparison results for the classes indicating shortages in the raw images with respect to the blocks, and
wherein the selecting unit selects, among the target candidate images, the first target candidate image having a smallest sum of shortages in the classes as the target image and, when multiple target candidate images has the smallest sum of shortages, selects one of the target candidate images having the smallest sum of shortages as the target image on the basis of the comparison results for the classes indicating excesses in the raw images with respect to the blocks.

10. The image processing apparatus according to claim 9, further comprising:
an assignment receiving unit configured to receive an assignment of a plurality of target candidate images as candidates of the target image.

11. The image processing apparatus according to claim 9, further comprising:
a block-characteristic value calculating unit configured to calculate a characteristic value of the characteristic for each of the blocks on the basis of pixel values of pixels in each of the blocks in a target candidate image;
a center-value calculating unit configured to calculate, on the basis of the characteristic value of each of the blocks, a center value representing a characteristic value of the characteristic for each of the classes, the center value being calculated for a predetermined number of classes and used for classification; and
an image classification unit configured to calculate, on the basis of pixel values of pixels in the raw images, a characteristic value of the characteristic of each of the raw images and placing each of the raw images into a class on the basis of a distance between the class and the center value,
wherein the image classification unit places each of the blocks into one of the classes on the basis of the characteristic value of the block and the distance between the class and the center values.

12. The image processing apparatus according to claim 9, further comprising:
a block-characteristic value calculating unit configured to calculate a characteristic value of the characteristic for each of the blocks on the basis of pixel values of pixels in each of the blocks in a target candidate image,
wherein the block classification unit places each of the blocks into one of the classes on the basis of a distance from the characteristic value of each of the blocks to a predetermined center value that is used for classification and represents a characteristic value of the characteristic of each of the classes, and
wherein each of the raw images is placed into a class in advance on the basis of the center values.

* * * * *